United States Patent [19]
Boley

[11] Patent Number: 6,132,629
[45] Date of Patent: Oct. 17, 2000

[54] METHOD AND APPARATUS FOR CONTINUOUS OR INTERMITTENT SUPPLY OF OZONATED WATER

[75] Inventor: Roger J. Boley, 17106 Majestic Ridge Rd., Austin, Tex. 78738-1208

[73] Assignee: Roger J. Boley, Austin, Tex.

[21] Appl. No.: 09/243,711

[22] Filed: Feb. 3, 1999

Related U.S. Application Data

[60] Provisional application No. 60/105,027, Oct. 20, 1998.

[51] Int. Cl.⁷ .................................................. C02F 1/78
[52] U.S. Cl. ..................... 210/760; 210/765; 210/167; 210/188; 210/192; 210/194; 210/205; 210/218; 422/29; 422/186.12
[58] Field of Search .................................. 210/758, 760, 210/765, 167, 188, 192, 194, 198.1, 205, 218; 422/28, 29, 186.12

[56] References Cited

U.S. PATENT DOCUMENTS

| | | | |
|---|---|---|---|
| 4,070,279 | 1/1978 | Armstrong | 210/14 |
| 4,562,014 | 12/1985 | Johnson | 261/64 |
| 4,977,094 | 12/1990 | Goldstein et al. | 436/157 |
| 5,032,292 | 7/1991 | Conrad | 210/764 |
| 5,053,143 | 10/1991 | Miller et al. | 210/748 |
| 5,332,511 | 7/1994 | Gay et al. | 210/755 |
| 5,336,165 | 8/1994 | Twardowski | 604/5 |
| 5,336,413 | 8/1994 | van Staveren | 210/650 |
| 5,352,369 | 10/1994 | Heinig, Jr. | 210/760 |
| 5,364,537 | 11/1994 | Paillard | 210/743 |
| 5,415,786 | 5/1995 | Martin et al. | 210/760 |
| 5,433,866 | 7/1995 | Hoppe et al. | 210/748 |
| 5,514,284 | 5/1996 | Uban et al. | 210/709 |
| 5,585,003 | 12/1996 | Van Newenhizen | 210/646 |
| 5,683,576 | 11/1997 | Olsen | 210/138 |
| 5,709,799 | 1/1998 | Engelhard | 210/748 |
| 5,766,488 | 6/1998 | Uban et al. | 210/739 |
| 5,868,945 | 2/1999 | Morrow et al. | 210/760 |
| 5,968,352 | 10/1999 | Ditzler | 210/220 |

*Primary Examiner*—David A. Simmons
*Assistant Examiner*—Betsey J. Morrison
*Attorney, Agent, or Firm*—Garrison & Associates PS; David L. Garrison

[57] ABSTRACT

Method and apparatus for a continuous or intermittent supply of ozonated fluid, particularly water, from a closed loop system for sanitation, consumption, and other purposes. A preferred embodiment of the apparatus aspect of the invention comprises an ozone generator, an ozone entraining system, and a closed loop water circuit. The closed loop circuit permits continuous recirculation and ozonation of fluid not drawn from the system for use. Optionally the apparatus provides for the removal of an arbitrary fraction of ozonized or ozonated water to any arbitrary service application, such as food- or medical-equipment sterilization, with simultaneous addition of makeup water to maintain a relatively constant mass balance in the overall system, so that ozonized water is continuously available. Unused water is stored indefinitely in a reservoir. Further options include venting of off gases and destruction of any ozone gas fraction thereof.

38 Claims, 4 Drawing Sheets

METHOD AND APPARATUS FOR CONTINUOUS OR INTERMITTENT SUPPLY OF OZONATED WATER

This application claims the benefit of U.S. Provisional Patent Application Ser. No. 60/105,027, filed Oct. 20, 1998, and entitled Method and Apparatus for Continuous Supply of Ozonated Water.

TECHNICAL FIELD

The invention relates to method and apparatus for the continuous production and availability of ozonated water and other fluids, and in particular the continuous or intermittent production of ozonated water and ice from a closed-loop system for sterilization purposes, in particular for food, medical, potable water, and a variety of military applications.

BACKGROUND OF THE INVENTION

Ozone is a naturally occurring allotrope of oxygen, specifically $O_3$, as opposed to the more usual form of oxygen, $O_2$. It has been known and used for many years as a disinfectant and oxidant, particularly in water sterilization and in the food service industries. Ozone kills all species of dangerous food bacteria rapidly. When dissolved in water, ozone exhibits biocidal qualities at concentrations below 0.5 parts per million. In aqueous solution it is capable of disinfecting food in less than a minute at concentrations of only 0.10 mg/liter, and much faster at higher concentrations. By contrast, chlorine requires more than an hour at concentrations of 1.0 mg/liter to accomplish the same level of sanitization. Moreover, ozone imparts no taste or odor to foods, and helps to maintain healthy and attractive coloring. Nor does ozone create harmful byproducts in sanitizing, in as much as it breaks down to molecular oxygen after sanitizing reactions. Chlorine creates many undesirable and/or toxic organo-chloro compounds, and leaves undesirable tastes and odors in foods. For the same reasons, ozonated water is superior for use in ice machines, potable water production, swimming pools, hospitals and medical laboratories, fishing vessels, ships, military applications, and waste destruction.

Commercially, ozone is generated by a number of means, but most typically in the electrical field of a corona when relatively large quantities of the substance are desired. Ozone is not a stable compound, possessing a half-life which is affected by several factors, including temperature, pressure, light, or the presence of any other material which will function as a reducing agent, i.e., a source of electrons. The substance is more stable at low temperatures and when placed in uncontaminated aqueous solutions, etc. Copious data is available anent ozone in any handbook of Chemistry and Physics, as well as many other sources. The International Ozone Association is a particularly good source for information on Ozone.

One of the safest and most convenient means for using ozone as a disinfectant or sterilizer of food and the like has been to force it into solution with water, and to use the resultant aqueous solution to wash the food, etc. A principal limitation to this use of ozone, however, has been the difficulty of providing ozonated water on a selectably continuous, intermittent, or demand basis. This is due at least partly to difficulties in handling gaseous ozone and storing ozonated water, and also supplying relatively smaller quantities of ozonated water. To do so it is found to be very advantageous to allow for the selectively continuous recirculation of previously-ozonated water through the ozonating apparatus, so that the selective removal of arbitrary amounts of ozonated water is immediately compensated by the introduction of fresh water for ozonation and so that the remaining previously-ozonated water can be maintained at the highest possible or suitable level of ozonation. Yet ozone, particularly in its gaseous form, can be highly corrosive with some materials. In solution, it can be corrosive and/or passivating, depending upon the particular material. It is typically the case (traditionally) that water to which ozone is added does not return to the point in a system where ozone was injected. Specifically, this is to say that ozonated water is not recirculated in a closed loop, especially where the recirculated water is continuously re-ozonated. This is due to problems of corrosion, materials compatibility problems, and the absence of need to return ozonated water to the point where ozone was injected. However, and especially where relatively small quantities of ozonated water are desired, it is advantageous, albeit difficult, to provide closed loop recirculation with continuous or intermittent withdrawal of the ozonated water product. This difficulty has been especially vexing where relatively small quantities of ozonated water are required, but on a substantially continuous basis, such as the feed of ozonated water to ice machines, surgical wash stations, small washing operations, waste destruction, disinfecting seafood, poultry, produce, etc.

Several attempts at providing ozonated water for sterilization or disinfectant use have been made, but none is optimized for the effective, economical, and efficient solution of problems associated with the continuous or intermittent supply of ozonated water, particularly where relatively small amounts are desired, through the use of continuous recirculation or feed back loops in systems operating at low pressures. For example, U.S. Pat. No. 5,585,003 to Van Newenhizen discloses method and apparatus for treatment of feedwater for use in dialysis by means of ultraviolet radiation and ozonation. Like many attempts at sterilization through the use of ozonated water, however, the Van Newenhizen method relies on the use of bubble column diffusers, which are inefficient devices for entraining ozone in water. The efficiency of the Van Newenhizen device also suffers through its requirement for means for actively monitoring the water level within the system, and for replacing water withdrawn for use after ozonation. Moreover, due to its sole intended purpose of providing purified water for dialysis, the Van Newenhizen system is adapted for the ozonation of water treated by deionization or reverse osmosis processes only. For most day to day drinking and sterilization applications, it is advantageous for an ozonation system to be compatible with any type of water or liquid.

U.S. Pat. No. 5,352,369 to Heinig, Jr.; U.S. Pat. No. 5,364,537 to Paillard; U.S. Pat. No. 5,415,786 to Martin et al.; U.S. Pat. No. 5,433,866 to Hoppe et al.; U.S. Pat. No. 5,514,284 to Uban et al.; and U.S. Pat. No. 5,709,799 to Englehard all describe apparatus for the continuous production of relatively large amounts of ozonated water by means of open water cycles: water is taken in, treated, and discharged without further cycling through the ozonation apparatus. For relatively smaller applications, and in some large-scale production applications, the use of closed-loop recirculation systems has been found to be more efficient.

U.S. Pat. No. 5,336,413 to van Staveren discloses process and apparatus for the purification of water by injection of oxygen, ozone, and other compounds. The van Staveren device is relatively complex, involving multiple chemical reactors and a number of pumps to santize water under pressures as high as 16–20 bars and recycling of treated water through various filtration stages.

U.S. Pat. No. 5,683,576 to Olsen discloses water ozonation treatment apparatus having limited recirculation capability for water which has become contaminated within the system. However, recirculation of ozonated water is not continuous, and the Olsen apparatus is incapable of dispensing water while recirculation is taking place. Moreover, activation and monitoring of the recirculation cycle requires a microcomputer or other microcontroller.

Thus there is a need for efficient, effective, and economical means for producing ozonated water on a selectively continuous or intermittent basis.

DISCLOSURE OF THE INVENTION

Accordingly, it is an object of the invention to provide method and apparatus for the continuous or intermittent provision of ozonated water. It is a further object of the invention to provide method and apparatus for the continuous or intermittent provision of ozonated water through the use of closed loop water circuits. Thus it is a further object of the invention to provide apparatus, including closed loop circuits, for the continuous or intermittent ozonation of water. It is a further object of the invention to provide such systems and apparatus adapted for economical and efficient operation at low pressures, with a minimum of components. Thus it is a further object of the invention to provide an ozonation system which optionally uses venturi-type injectors or eductors to entrain ozone in the operating fluid. These and such other objects of the invention as will become evident from the disclosure below are met by the invention disclosed herein.

The apparatus disclosed herein provides the ability to generate a continuous stream of ozonated water on demand for disinfecting, cleaning, drinking, deodorizing, etc. By recirculating unused or surplus ozonated water in a closed loop circuit, while continually adding more ozone gas to it, the ozonating apparatus of the invention provides a 100% availability for an ozonated water stream, up to a capacity of the unit defined by the size of the recirculating water pump and the size of the eductor. The capacity of such a unit can thus vary from very low, say 0.1 gallons per minute, to several hundred gallons/minute. Nominal capacity is 0–10 gallons/minute.

In one aspect the invention comprises the combination of an ozone generator, preferably of the corona discharge type, and a mechanism by which generated ozone gas can be put into aqueous solution and recirculated in a closed loop water circuit, while optionally destroying the ozone gas which does not go into solution. Optionally such apparatus further provides capability for the removal of some fraction of such recirculated ozonized (ozonated) water to any arbitrary service application, such as food- or medical-equipment sterilization, with simultaneously provision of makeup water to maintain a relatively constant mass balance in the overall system, so that ozonized water is continuously available on demand. That is, the apparatus aspect of the invention comprises a device which permits the continuous introduction of a gas from an ozone ($O_3$) gas generating system, (typically air containing ozone ($O_3$)), into a closed loop recirculating water system, such that the ozone gas, or a significant portion thereof, will become dissolved into the water, while simultaneously venting those gases (sometimes referred to as "off gases"), which do not go into solution, and optionally destroying the ozone gas fraction in the off gas. The system further permits optional withdrawal of the resultantly ozonated water to any appropriate service application, while simultaneously allowing for the addition of makeup water to thus maintain a relatively constant total volume of water in the system, the whole of which being continuously recirculated. Thus in general preferred embodiments of the overall system comprise six (6) subsystems: a) a water circulating system; b) a water withdrawal system; c) a makeup or inlet water system; d) an ozone generating system; e) a vent/ozone destruction system; and f) an ozone dissolving or entraining system, which preferably comprises an injector or eductor system. Each of these systems works in conjunction with the others, essentially simultaneously, to produce the results described herein.

A preferred water circulating or recirculating system according to the apparatus aspect of the invention comprises a single water pump, an ozone entraining system comprising an injector (or an "eductor"), a solenoid valve in the suction line to the eductor, a water holding vessel, a gas vent, a pressure gauge, a plurality of pressure switches (preferably 2), and a return line to the pump suction which contains a check valve, and various piping and/or tubing to connect such components. Preferably the circulating system allows continuous recirculation of previously ozonated water through the ozone entraining system.

A preferred water withdrawal system for use with the apparatus aspect of the invention comprises an orifice in the water holding vessel, preferably located in the lower half of the water holding vessel in order to avoid gas entrainment and subsequent gas discharge to service, through which ozonated water can be withdrawn to some service application. In a typical food service or medical sterilization application this orifice could comprise a simple ¾" threaded female orifice. As those familiar with ozone sterilization techniques will appreciate, however, the size and nature of the orifice may vary considerably according to the particular application.

A preferred makeup or inlet water system for use with the apparatus aspect of the invention works in conjunction with the recirculating water system and supplies startup or makeup water, which enters the system at any point between the pump suction proper and the check valve in the return line, to the pump suction. The check valve here mentioned is preferably located in the water line which exits the bottom portion of the water holding vessel, and proceeds directly to the pump suction. This location of the check valve is critically important in order to prevent the makeup water pressure from creating back-pressure on the eductor, thus causing deterioration or termination of eductor performance. Preferably, in small food disinfection or sanitatization applications, the makeup water system comprises of an external pressurized supply of water (in some applications a city water line will suffice), which is connected to the ozonization system machine via any suitable conduit. In some applications, a garden hose or similar hose or pipe will serve. Makeup water then flows through a pressure regulating valve (PRV) connected in series with a solenoid valve in said water line, and is thus able to flow into the recirculating system when said solenoid valve is open.

An ozone generating system suitable for use with the invention comprises an ozone generator of suitable capacity for the application, preferably an air dryer to supply dry air to the ozone generator, and optionally a flowmeter with integral valve to limit dry air flow to the appropriate rate for the ozonator, or for the particular application. However, the flowmeter can be replaced with a suitably sized or adjustable mechanical orifice. Ozone generators may be of many types, the preferred type for a given application being dependent upon the amount of ozone required and power, space, and maintenance facilities available. For many food and medical equipment sterilization applications, potable water, waste destruction, etc., and for the disinfecting or improvement of air in building interiors, a preferred generator is of the corona discharge type, which is well known to those engaged in the art of generating ozone. Means of electrically generating ozone include electrical discharge through oxygen or the high-current electrolysis of sulfuric acid. The second edition of VanNostrand's Scientific Encyclopedia states that ozone generators have been made in various forms, but in general comprise two or more discharging surfaces placed in juxtaposition so as to form a condenser with an air gap which may or may not be furnished with a dielectric element, and that most successful ozone generators have smooth electrodes and dielectrics, and assume either cylindrical or plate forms. Such generators are operated on voltages ranging from 5,000 to 25,000, and at frequencies between about 50 and 500 Hertz. An average yield of such generators approximates 50 grams per kilowatt per hour, although much higher yields are possible. It is also frequently necessary to cool ozone-bearing air in order to dry it for use for other purposes. Examples of ozone generators suitable for use with the invention are those produced by Clean Air and Water Systems of Edmonds, Wash., and by Ozone Pure Water Inc., of Sarasota, Fla.

Ozone dissolving or entraining systems suitable for use with the invention may advantageously be of several types, depending upon the particular application to which the ozonating system is to be put. For example, bubble column diffusers or entraining devices, which are well known, are suitable in many instances, particularly where the efficiency of entrainment of the ozone in the operating fluid is not critical. A bubble column entraining device provides for the release of gaseous ozone at or near the bottom of a reservoir of water, so that some portion of the ozone, which tends to rise toward the surface of the reservoir, dissolves or becomes entrained in the water. So called vortex-generating entraining devices work along similar lines. However, for efficient entrainment and dissolution of ozone in the operating fluid, and particularly in water, a particularly preferred entraining mechanism for use with the invention is an eductor, or injector (for purposes of this disclosure the terms are synonymous), which operates according to the Bernoulli principle by means of a venturi to generate a low pressure area to entrain ozone gas in the eductor operating fluid, which for the purposes disclosed herein is preferably water provided from the discharge side of a small recirculating pump. Technical information anent eductors is commonplace in scientific literature. Moreover, eductors are marketed and elucidated by several manufacturers. Examples of eductors suitable for use with the invention described herein are provided by the Mazzei Injector Corp. of Bakersfield, Calif.

It has been found that entrainment of ozone in water by eductors may be further enhanced by forcing water from the discharge side of the eductor, together with the ozone released into the water in the eductor, through a plate or other relatively impermeable surface containing a plurality of small holes. One form of a diffusion-enhancing device which has been employed to great advantage with the invention comprises a capped conduit of polyvinyl chloride or other suitable material attached to the discharge side of the eductor in such manner that a substantial portion of the eductor discharge passes into the conduit. The conduit is perforated with holes of aggregate cross-sectional area to slightly exceed the cross-sectional diameter of the conduit, so that all of the eductor discharge entering the conduit can be passed through the holes without inducing a back pressure in the eductor, which would impair the functioning of the eductor.

The use of an eductor in the ozonating system increases the efficiency of the system in several ways. For example, use of an eductor permits the use of a single pump to move liquid through the ozonating system and to provide pressure for removing ozonated fluid from the system, thereby eliminating the need for multiple pumps; and it greatly increases the efficiency of mass transfer of ozone to the operating fluid under all operating conditions. One result of using an eductor is that substantially constant ozone concentration levels are guaranteed within the operating fluid.

Vent/ozone destruction systems suitable for use with the invention comprise at least one gas vent which enables the gas in the water holding vessel to escape, while simultaneously venting only very minimal quantities of water. In embodiments of the invention which employ vent or destruction systems this vent is preceded or followed by a solenoid valve, which is open during system operation, allowing gases to thus escape. In preferred embodiments, after the gas passes through the vent it is directed to a suitably sized polyvinyl chloride (PVC) cylinder filled with activated carbon granules or other suitable ozone-reducing agents. In this cylinder the ozone gas reacts with the carbon or other agent to form carbon dioxide ($CO_2$) or some other suitably inert compound, which, along with a typically very small amounts of water, perhaps 0.1–0.2 gallons per minute, is discharged outside the system, for example, to the ground, floor, drain, sewer, or atmosphere. The gaseous and liquid discharge at this point is essentially identical with air and the makeup water used in the process, although sterile. No pollutants are discharged. It should be noted that over a period of time the carbon granules will have to be replenished as approximately 8 grams of ozone will react with 1 gram of carbon to form carbon dioxide. One example of carbon granules, or fines, suitable for use with the invention comprises NORIT RB-3, which is available from Norit Americas, Inc., of Atlanta Georgia. NORIT RB-3 comprises extruded carbon granules of about 3 mm diameter and about 7 mm in length.

An alternative means of dealing with "off gas" containing ozone is simply venting to atmosphere in a safe location, or, using a small heating element tolerant of water to expse the off gas to a temperature of approximately 140 to approximately 160 degrees Fahrenheit, thereby destroying the ozone with resultant conversion back to molecular oxygen, $O_2$.

A preferred method for continuously providing ozonated water according to the invention comprises the steps of generating ozone, dissolving said ozone in a liquid, preferably water, by means of an entraining device in a closed loop circulating/recirculating and storage system, optionally destroying or rendering harmless any off gasses produced during ozonization or during the ozone-generating process, and allowing the optional removal of ozonated fluid for use in sterilizing and other applications. Preferably such method comprises continual recirculation of water, within all or a substantial portion of which ozone has previously dissolved, through the entraining device in which ozone is dissolved in the water.

BEST MODE OF CARRYING OUT THE INVENTION

Turning now to the drawings, the invention will be described in one or more preferred embodiments by reference to the numerals of the drawing figures wherein like numbers indicate like parts.

Figure 1:
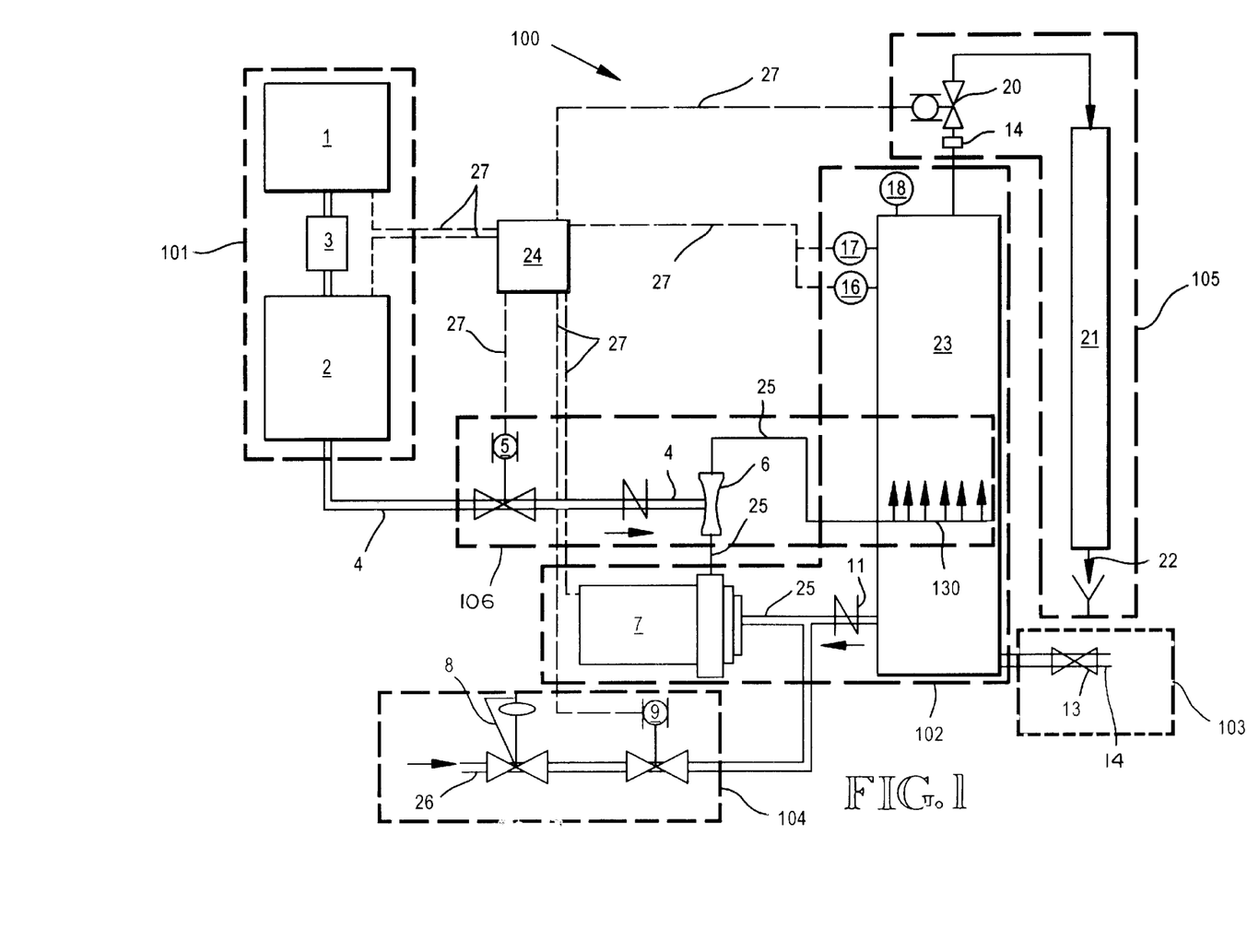
FIG. 1 is a schematic view of a preferred system for providing ozonated water according to the invention.

FIG. 1 is a schematic view of a preferred system for providing ozonated water according to the invention. The apparatus 100 comprises ozone generating system 101, water recirculating system 102, water withdrawal system 103, inlet/makeup water system 104, vent/ozone destruction system 105, and ozone entraining system 106. Ozone operating system 101 comprises optional air dryer 1, ozone generator 2, ozone or ozonated air feed line 4, and optional flowmeter 3. Water recirculating system 102 comprises water pump and motor 7, water lines 25, water retaining and recirculating vessel 23, eductor 6, and optional pressure indicating system components 16, 17, and 18. Water withdrawal system 103 comprises tap or valve 13 and service water line 14. Inlet/makeup water system 104 comprises water supply line 26 and optional pressure regulating valve 8 and flowmeter 9. Optional vent/ozone destruction system 105 comprises gas vent 19, valve 20, carbon fine ozone destruction unit 21, and waste drain 22. Ozone entraining means 106 comprises optional solenoid valve 5, injector or eductor 6, and optional diffusion enhancing device 130. Optionally, injector or eductor 6 may be replaced by a bubble-column diffuser, vortex-generating diffusion devices, or other means for entraining ozone in the water. Also shown in FIG. 1 are valve 9, check valve 11, ball valve 13, electrical connections, switches, and controls 24, and power supply lines 27. The application of such devices will be well understood to those skilled in the art of designing fluid systems.

A preferred mode of operation of the system shown in FIG. 1 includes the steps of filling the recirculating water system with water to the correct pressure, the correct pressure, as will be appreciated by those familiar with the construction and/or operation of fluid systems, being a function of operating system component capacities and the intended application of the system. In many instances the preferred water pressure will be 20–30 psig, as this pressure on the discharge side of the eductor provides optimal mass transfer of ozone to the water and is useful for many commercial and residential water treatment purposes. Pumps and other powered components are supplied with power, most components being adequately supplied with standard 120 Volt AC outlet power. The makeup water supply line is charged, a satisfactory pressure for most systems being 30 psig after the pressure regulating valve (PRV), and connected to the service application via appropriate means with materials compatible with ozonated water. Given this, the machine is ready to commence automatic operation. To understand this operation, it is helpful to understand the role which pressure switches can play in the overall operational scheme.

The system is both activated and deactivated, when it is not desired that the system run continuously, by pressure switch settings. The pressure switches are connected to the water vessel; in the system shown there are two (2) of same, each with two (2) set points. These will be referred to as pressure switch #1 (PS# 1, reference 16 in FIG. 1) and pressure switch #2 (PS# 2, reference 17 in FIG. 1). PS#1 is chiefly used as a high pressure alarm and shutdown mechanism. For example, in the system shown, which is adapted for food sterilization based on standard utility-supplied water, PS#1 would be set, utilizing the high pressure point of PS#1, to cause system shutdown if for any reason the water vessel pressure reached 60 psig or more, or other appropriate setting depending upon the particular application. Simultaneously, the low pressure point of PS#1 would be set at 0 psig, as it is typically not used in such applications, however, it could be used for controlling a minimum pressure if desired for the particular application.

In the embodiment shown PS#2 is the principal controlling pressure switch. In operation PS#2 is set at a high pressure setting just slightly below the static pressure of the makeup supply line, previously mentioned as 30 psig for the application shown; thus for example a value of 28 psig is suitable for the system depicted. The low pressure setting on PS#2 is set at a pressure below 28 psig, 15 psig being another typical suitable value. Suitable values for pressure settings, as will be appreciated by those skilled in the art of fluid system design, will depend upon line and component ratings and capacities, or the particular requirements of particular applications.

Operations are initiated, in the static mode (that is, the mode in which no ozonated water is being withdrawn from the system) at an appropriate static pressure—in the case of this example would be 30 psig—by closing the three (3) solenoid valves 5 (pre-eductor), 9 (water inlet), 20 (post vent), thus holding the 30 psig static pressure. In this situation (makeup water solenoid valve closed, post-vent solenoid closed, and pre-eductor solenoid valve closed), any water withdrawn from the system will cause a rapid fall in system pressure. For example with a 2.8 US gallon water holding vessel 23, a water withdrawal of only 30–40 milliliters, will in fact cause a pressure drop on the order of 15 psig. This pressure drop trips the lower set point of PS#2, which activates the entire system. Specifically, at the time of the pressure drop to, or below, the low point setting of PS#2, the water pump, the ozonator, and the three (3) aforementioned solenoid valves all become operational, and the system begins producing ozonated water for service application.

More specifically, what is happening during operation is as follows:

1. Once operation is initiated by a drop in system pressure, the water pump 7 delivers a pressurized water flow to the eductor 6. This generates a low pressure area at the suction port or suction chamber of the eductor, and dry ozonated gas (air) is permitted to flow through the solenoid valve 5 in the suction or feed line 4 to the eductor 6, and into the eductor where said gases are entrained in the water flow moving through the eductor. The majority of mass transfer of ozone gas occurs in the eductor proper, as entrained gaseous ozone is dissolved as the water passes through the eductor outlet. Additional mass transfer occurs in the water line leading to the storage tank, within the storage tank itself, and elsewhere. The actual amount of ozone solubilized in the eductor operating water flow depends upon the temperature, pressure, and the actual volume of water moving through the eductor, in addition to the concentration of ozone in the gas suction flow to the eductor, as well as the volume of said gas suction flow. It has been found that mass transfer of ozone to water is optimized at between about 20 and about 30 psig. It has also been found that accelerating liquid/gas mixtures, where the gas contains ozone, through diffusion-enhancing devices which effectively accelerate the liquid/gas mixture, after exiting the discharge side of an eductor, through one or more orifices to cause the formation of small gas bubbles within the liquid, will increase mass transfer of ozone to the water.

2. From the eductor 6 the water and gas mixture (typically not all of the gas is solubilized), moves via pipe or hose 25 to the water holding vessel 23. (Vessel 23 can be of any size, depending upon the application to which the system is to be put, but for light commercial and residential uses would typically contain 1–5 gallons of water). In water holding vessel 23 the non-dissolved gas bubbles to the top of said vessel where it is vented. Note that this is important, as it prevents the system back-pressure from reaching a point where the operation of eductor 6 would terminate.

3. After being vented, gas (called "off gas"), and a very small amount of water, are optionally sent to waste after passing through carbon granule vessel 21, typically attached to the side of the ozonation system machine, and the ozone waste gas is converted to carbon dioxide, $CO_2$.

4. The degassified ozonated water solution, under the pressure prevailing in water holding vessel 23, is then free to travel to the service application via line 14, or, to return to the pump suction to repeat the cycle, or, both. In actual practice, "both" is the most typical scenario with some water going to service and some returning to pump 7 to again go around the loop and to be re-ozonated in the process.

5. As ozonated water is withdrawn from the water holding vessel and sent to service, the system pressure is reduced. This is noticeable by observing the pressure gauge on the water holding vessel. Simultaneously, as water is withdrawn to service and pressure in vessel 23 is lowered, makeup water is permitted to enter the suction line to the recirculation pump 7 (because the makeup water pressure is higher than the water holding vessel pressure), and, because the entry point of this water is between the pump suction proper and the check valve 11 in the suction line, all of the makeup water must go through the pump, and cannot immediately go into the vessel, thus back-pressuring the system and causing deterioration of eductor performance. Rather, the makeup water pressure is boosted by the action of the pump, which assists the performance of the eductor, thus creating a stronger vacuum in the suction chamber of the eductor and improved gas suction flow in feed line 4. This is of special importance in maximizing ozone entrainment and solubility in the system water. Moreover, it ensures that all fresh water entering the system is first ozonated, rather than being able to mix with previously ozonated water, thus reducing the ozone concentration in the latter. This is a key aspect of the success of the invention.

6. Given the above conditions and situations, the ozonation system machine will continue to operate, at both consistent and/or variable flow, until the flow of service water is terminated. When the flow of service water is terminated, equilibrium will again be restored, and the preset static system pressure, 30 psig in this given case, will again be achieved. This is because the termination of water withdrawal to service will rapidly cause the pressure in the water holding vessel to rise to the high set point of PS #2 (gauge 17) (in actual practice this time is a few seconds).

Given this, the ozonation system machine 100 will continue to operate for a brieftime (or indefinitely, if desired), according to the time value preset on a timer activated by the tripping of the high pressure set point on PS#2, and then, if desired, will terminate operation entirely until service water is again withdrawn from the system, and the cycle will repeat. Note here that if the service water flow is continuous, system operation will also be continuous, and this is perfectly acceptable; intermittent operation is also perfectly acceptable.

Figure 2:
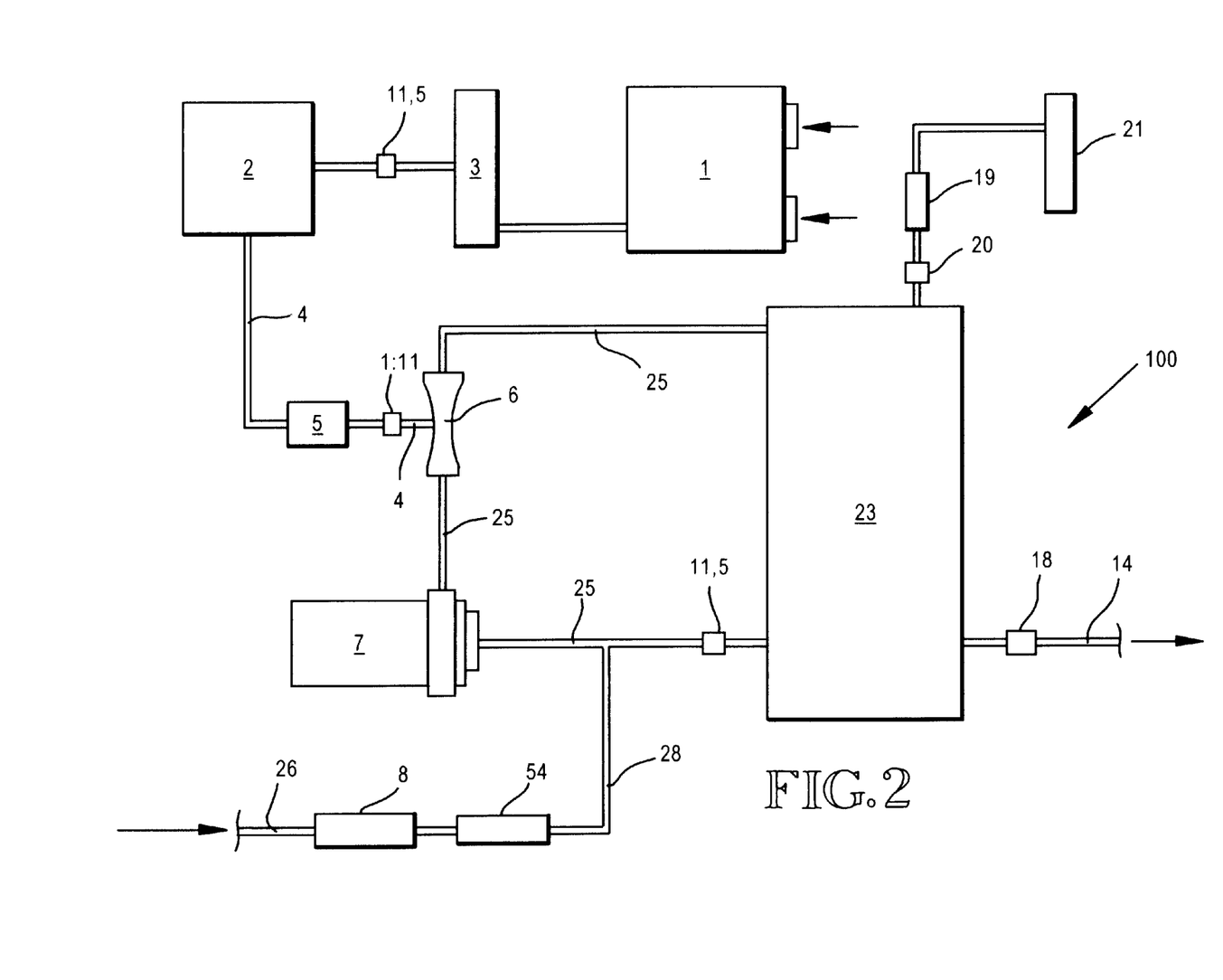
FIG. 2 is a schematic view of an alternative preferred embodiment of a system for providing ozonated water according to the invention.

In the alternative preferred configuration shown in FIG. 2 the system shown in FIG. 1 is modified by elimination of pressure switch 17 (PS#2), solenoid valve 9 and solenoid valve 20, and replacement of these parts with suitable and appropriately sensitive flow switch 54, which is inserted in the inlet/makeup water line 28 in approximately the same position as that previously occupied by solenoid valve 9. Optional components such as dryer 1, flowmeter 3, check valves and solenoid valves and tap or valve 18 are also shown. The position of the flow switch in the inlet or makeup water line 28 is not critical. When water is withdrawn from the system, flow through flow switch 54 causes the system to activate, if it has been inactive. The termination of flow through switch 54 causes the system to deactivate, if desired, in a manner similar to that of the embodiment shown in FIG. 1. No other changes are required in the overall system. This operational scheme is advantageous when it is known that the water withdrawal rate will be large, thus easily allowing correct operation of a suitable flow switch. It may have much more difficulty operating when the water withdrawal rate is very low, such as in the application of supplying ozonated water to a small ice machine, where the water supply requirements are quite low, frequently being less that 0.1 gallons/minute. Flow switch operation in this flow range is not always reliable with flow switches now commercially available. It should be further noted that this alternative embodiment of the invention may be used to slightly reduce overall system costs, as the number and cost of relatively expensive components is reduced.

In FIGS. 1 and 2 the recirculation system comprises pump 7, fluid lines 25 and 28, which pass through eductor 6, and storage tank 23. As will be understood by those skilled in the art of making fluid circulation systems, valves or gauges may be added as needed to monitor or control the system.

A key component of the invention lies in the materials with which various portions of the system which are exposed to ozone, such as conduits, valves, reservoirs, piping, and meters, are made or coated. Preferred coatings and materials for such components when the ozone is in the gaseous stage, either pure, mixed with air, or otherwise, comprise teflon (polytetrafluoroethylene), stainless steel, brass, kynar, and similar materials. When the ozone is in solution, and in particular aqueous solution, or is totally saturated with water or other fluid, a great variety of materials commonly used in fluid or plumbing applications will suffice, including polyvinyl chloride (PVC), chlorinated polyvinyl chloride (CPVC), ethylene-propylene-diene (EPDM), ethylene-propylene, polypropylene, viton (a copolymer of vinylidene fluoride and hexafluoropropene), kynar, teflon, ceramics, most metals, most thermoplastics, and many other materials. When the ozone is in solution, the surface of the material used to contain or transfer the solution tends to oxidize to a limited extent, and stop. PVC and other materials used with ozone solutions have indefinite life spans, or to state it another way, are not prone to corrosive failure due to exposure to ozone solutions. Fluid lines, etc., not exposed to ozone are advantageously made of materials commonly used for the handling of the involved fluid. For example, for water polyvinyl chloride, polypropylene, acrylonitrile butadiene styrene (ABS), copper, EPDM, and other materials are satisfactory for use with water and a wide variety of other fluids.

Figure 3:
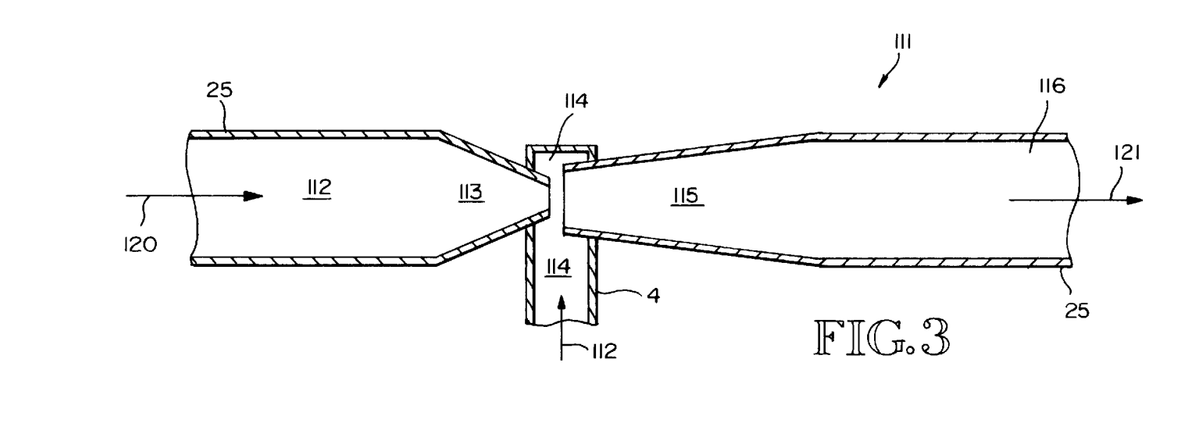
FIG. 3 is a schematic cross-sectional view of a preferred entraining or diffusing device according to the invention.

Another key component of the invention is the apparatus by means of which ozone is diffused or dissolved into the ozonated fluid. FIG. 3 is a schematic cross-sectional view of a preferred embodiment of an ozone entraining device for use with the invention. Eductor 111 comprises inlet 112, venturi nozzle 113, suction chamber 114, entrainment and diffusion nozzle 115, and discharge or outlet 116. Water (either fresh or previously ozonated) enters eductor 111 via fluid line 25 in the direction of arrow 120 under pressure provided by pump 7 (see FIG. 1). The water passes through venturi nozzle 113, developing a suction in suction chamber 114, so that ozone gas entering the eductor via ozone line 4 in the direction of arrow 122 is drawn into the water stream and entrained with the water in nozzle 1 5. As water and entrained ozone pass along the nozzle through discharge port 116 into fluid line 25 in the direction of arrow 121, the entrained ozone, or at least a significant portion thereof; dissolves in the water.

Figure 4:
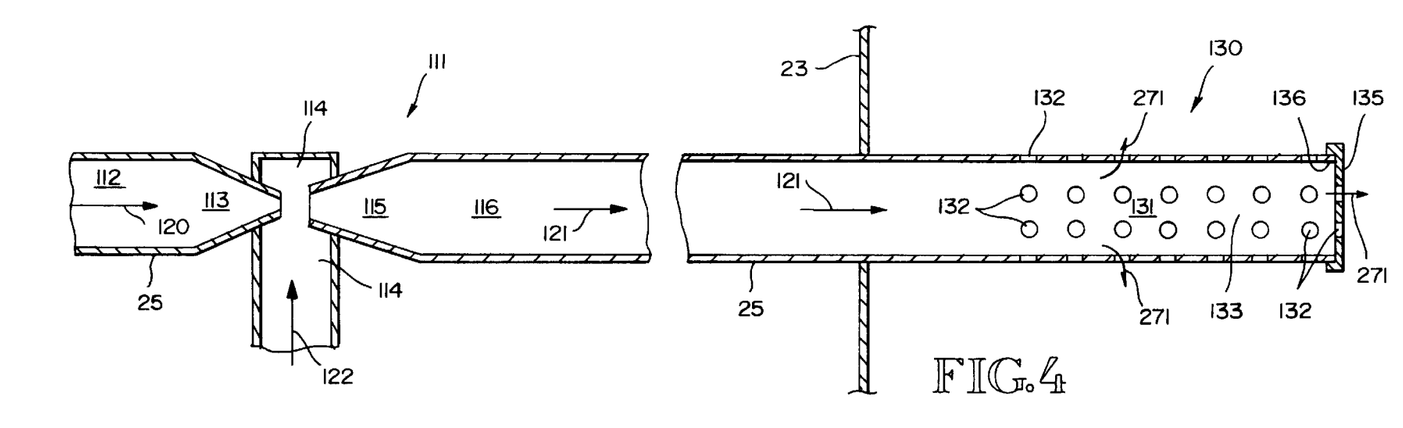
FIG. 4 is a schematic cross-sectional view of a preferred embodiment of a diffusion-enhancing device according to the invention.
Figure 5:
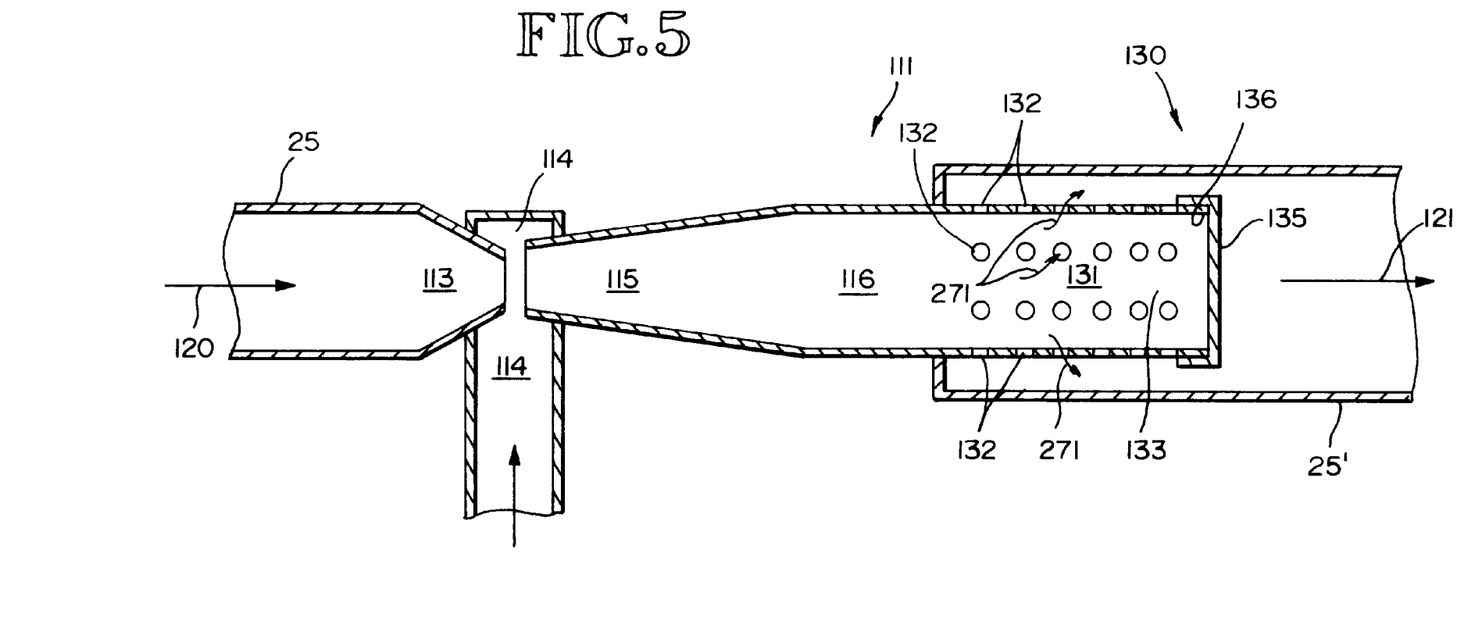
FIG. 5 is a schematic cross-sectional view of an alternative configuration of a preferred embodiment of a diffusion-enhancing device according to the invention.

Another key component of the invention in those embodiments of the invention comprising eductors is an optional diffusion-enhancing device disposed at the discharge side of the eductor. FIG. 4 is a schematic cross-sectional view of a preferred embodiment of such a device. As the mixture of water and ozone leaves outlet or discharge end 116 of eductor 111, it passes through fluid line 25 to chamber 131 of diffusion-enhancing device 130, which is preferably located inside storage tank 23, and is forced through apertures 132 in wall 133 of the bubble chamber. Bubble chamber 131 is formed by providing cap 135 at end 136 of conduit 25 and providing a plurality of apertures 132 in the side walls of the conduit. As the water passes through apertures 132 in the walls of the bubble chamber in the direction of arrows 271, ozone entrained by but not yet dissolved in the water is more thoroughly mixed with the water, causing a substantial improvement in the dissolution of the ozone in the water. Although the size of the apertures will depend upon the temperature, pressure, and flow rate of the water and ozone through the diffusion-enhancing device, as will be appreciated by those skilled in the art, it has been found that in systems adapted for the processing of approximately 5–15 gallons per minute, at about 70° F. and at about 30 psig, the use of apertures of approximately 1/16" diameter provides excellent results. In order to prevent the buildup of back pressure in the eductor, it is preferred that the aggregate cross-sectional area of apertures 132 equal or slightly exceed the cross sectional area of fluid line 25. An alternative embodiment of such a diffusion-enhancing device is shown in FIG. 5, where the device is located at the immediate discharge end of eductor 111, outside the storage tank. Instead of passing directly into tank 23 through apertures 132, ozonated fluid passes from apertures 132 to fluid line 25', and thence to the storage tank.

Selection of a pump compatible with the transfer of ozonated fluids may be critical to successful implementation of the invention. For embodiments of the type and having the capacities described herein, a variety of suitable pumps are available. Among the group of satisfactory pumps are included (1) the Iwake model MD-70RLZ 11 gallons per minute unit, having a 0.25 HP motor and a 67 foot head maximum discharge available through Texas Process Equipment of Houston, Texas; (2) the Multi-Duti Mfg. Sequence 1000 pump comprising coatings and parts made of General Electric's ULTEM 2300(tm) polyether imid and a ½ HP motor, giving a 68 foot head maximum discharge; and (3) the AMT Inc. model 4893-98, 303 stainless steel close-coupled pump having type 21 mechanical seals, EPDM o-rings, a #5 carbon face, and a ceramic seat, and distributed by Master Pumps and Equipment of Houston, Tex.

The entire ozonation system of the invention can be enclosed in a wall mounted or free standing cabinet (for many food sanitation applications a space of approximately 30"W×30"H×10"D will suffice), mounted on a panel, or engineered to be mobile by utilizing suitable castors affixed to legs or appropriate support structure, to which a cabinet or panel mounted unit can be secured. The actual size of any particular unit will vary according to the desired capacity. The above referred size being nominal for a capacity in the range of 0–10 gallons/minute.

Once the system is set up and prepared for operation, operation is virtually automatic, where it is not continuous. Automatic operation initiated by the withdrawal of a small amount of water from the system (30–50 ml for the system shown in FIG. 1, or by sufficient water to activate a flow switch in the alternative embodiment of FIG. 2). Shutdown occurs automatically when water is no longer withdrawn to a service application, however, after service water flow is terminated, the system continues to operate for approximately 30 seconds in order to reestablish static equilibrium throughout. This is accomplished by a timer mechanism. After system shutdown, operation will again resume any time water is again withdrawn from the system. This method of shutting down the system applies to both the preferred and alternative embodiments described herein.

EXAMPLE

A system according to FIG. 1 is designed for food sterilization. Operation of the system is totally automatic within the design water flow capacity of the unit. Such a system will set up a flow of approximately 8 gallons per minute through the recirculation loop of the ozonation apparatus, and provide approximately 4.0 gallons/minute ozonated water flow, the water in said stream being ozonated to a concentration of approximately 2.0 mg/liter at 75° F. The system comprises a 4 grams/hour corona-discharge type ozone generator of the type available from Clean Air and Water Systems of Edmonds, Wash., and by Ozone Pure Water Inc. of Sarasota, Fla., with washdown hose and an HD-20B Dessicant air dryer available from Behrick Enterprises, Inc., of Vernon, British Columbia; a ½ horsepower Sequence 1000 recirculation pump available from Multi-Duty Manufacturing, Inc., of Colorado Springs, Colo.; a model 384, 484, 584, or 684 liquid motive eductor available from the Mazzei Injector Corporation of Bakersfield, Calif.; ¾" polyvinyl chloride water lines, ¼" ozone lines; a 23-inch long PVC retaining and recirculating vessel fashioned from 6-inch diameter PVC conduit; and the other parts and components previously mentioned. Design static water pressure is adjusted to 30 psig. Materials and coatings for various components comprise the following:

| | |
|---|---|
| Tubing from Dryer to Ozonator | PVC |
| Tubing from Ozonator to solenoid at eductor | teflon |
| Solenoid at eductor | Stainless with teflon seals |
| Eductor | Kynar |

-continued

| | |
|---|---|
| Unions at ends of eductor | PVC with EPDM o-rings |
| Piping from pump to vessel | PVC |
| Storage and recirculating vessel | PVC or polypropylene |
| Solenoid in vent line | Stainless with teflon seals |
| Tubing from Vent | PVC or teflon |
| Ozone destruction unit | PVC |
| Inlet water line | PVC |
| Inlet PRV | Brass |
| Inlet water solenoid | Brass |
| Outlet service line | PVC |
| Outlet service line valve | PVC with EPDM seals |
| Suction line to pump | PVC |
| Check valve in suction line to pump | PVC with EPDM seals |
| Pump | CPVC head and impeller with viton seals |

The unit is equipped with alarms or indicator lights for the following:

| | |
|---|---|
| Ozone generator failure— | alarm and shutdown |
| High recirculating water temperature— | alarm and shutdown |
| Ozone generator "on"— | power indicator light |
| Water pump "on"— | power indicator light |
| Air dryer "on"— | power indicator light |
| 120 VAC Power to system— | power indicator light |

The system is mounted in a cabinet, which is in turn mounted on wall convenient to the food processing area or other service area, either by bolting directly to the wall, or by attaching to the wall with unistrut. An ozone compatible garden hose or other desirable type of pipe, tubing, etc. (see materials listings above), is connected to the water withdrawal system, such that ozonated water from the system can be delivered to the service application. Said garden hose, pipe, tubing, etc., should ideally be equipped with a valve to control water flow as desired for the application. The system is then plugged into a convenient 120 VAC grounded outlet capable of providing service for a 10 amp load in the case where the water pump is equipped with a ½ HP motor. A suitable period is allowed (three (3) hours for the system described) for the air dryer system to cycle once such that suitably dry air will be provided to the ozone generator. If the dryer has previously been cycled, or, if it is known that the dryer desiccant is "dry", the three (3) hour wait can be negated. A city water supply or other suitable makeup water supply is connected to the water inlet of the system machine, and the solenoid valve in the makeup water line manually opened, by activating the manual switch for same, to permit the water recirculation system portion of the system machine to fill with water. (This procedure requires about two (2) minutes, depending upon inlet water pressure). Simultaneously, the pressure regulating valve in series with the aforementioned solenoid valve would be adjusted such that the desired water holding vessel operating pressure, typically 30 psig, is achieved, The system is operated as described above and provides up to approximately 4.0 gallons per minute of continuous ozonated water output for service, the water in said stream being ozonated to a concentration of approximately 2.0 mg per liter at 75° F., by means of a single pump operating in a continous recirculation water loop. As the system provides an 8 gallon per minute flow through the eductor, between 4 and 8 gallons per minute comprises recirculation flow, with the remainder being withdrawn to service.

With regard to systems and components above referred to, but not otherwise specified or described in detail herein, the workings and specifications of such systems and components and the manner in which they may be made or assembled or used, both cooperatively with each other and with the other elements of the invention described herein to effect the purposes herein disclosed, are all believed to be well within the knowledge of those skilled in the art. No concerted attempt to repeat here what is generally known to the artisan has therefore been made

INDUSTRIAL APPLICABILITY

The invention provides improved methods and apparatus for the sterilization of food, food processing equipment, medical equipment, and the like, in both civil and military applications, including the production of potable water. Specifically, the system provides increased efficiency and reliability in the production of ozonated fluids, including water for use in such processes, and allows the continuous or intermittent production of such fluids.

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

I claim:

1. Apparatus for the production and selectively continuous or intermittent dispensation of ozonated fluids, the apparatus comprising:

a water circulating system;

an ozone generator;

an eductor for entraining ozone generated by said ozone generator in water circulated by said circulating system;

a reservoir for holding ozonated water; and a water withdrawal system for allowing withdrawal of ozonated water from the apparatus.

2. The apparatus of claim 1, further comprising a makeup water system to replace water withdrawn from said apparatus.

3. The apparatus of claim 1, further comprising a vent apparatus for the removal of off gasses produced during ozonation of said water.

4. The apparatus of claim 1, further comprising apparatus for the destruction of off gasses produced during ozonation of said water.

5. The apparatus of claim 1, further comprising a diffusion enhancing device at a discharge end of said eductor.

6. A method for continuously or intermittently providing ozonated water, the method comprising the steps of:

generating ozone;

entraining said ozone in water in a closed loop circulating and storage system comprising a holding vessel for storing ozonated water;

allowing selective removal of ozonated water from said holding vessel; and recirculating ozonated water not removed from the circulating and storage system.

7. The method of claim 6, comprising the step of removing off gasses produced during ozonization or during the ozone-generating process.

8. The method of claim 6, comprising the step of replacing water removed from the circulating and storage system.

9. The method of claim 6, including the step of circulating water continuously through said entraining means until the water is withdrawn from the apparatus.

10. Apparatus for the production and selectively continuous or intermittent dispensation of ozonated fluids for use in disinfecting food and other items, the apparatus comprising:
   an ozone generator;
   a water circulating system;
   a device for entraining ozone generated by said ozone generator in water circulated by said water circulating system,
   a reservoir for holding ozonated water;
   a water withdrawal system adapted to allow withdrawal of ozonated water from the apparatus; and
   means for recirculating water not withdrawn from said reservoir through said entraining means.

11. The apparatus of claim 10, wherein said water circulating system includes means for continuously circulating water through said entraining means until the water is withdrawn from the apparatus.

12. The apparatus of claim 10, further comprising a makeup water system to replace water withdrawn from the apparatus.

13. The apparatus of claim 10, further comprising a vent apparatus for the removal of off gasses produced during ozonation of said water.

14. The apparatus of claim 10, further comprising apparatus for the destruction of off gasses produced during ozonation of said water.

15. The apparatus of claim 10, wherein said ozone entraining means comprises an eductor.

16. The apparatus of claim 15, further comprising a diffusion enhancing device at a discharge end of said eductor.

17. Apparatus for the production and selectively continuous or intermittent dispensation of ozonated water for use in disinfecting food and other items, the apparatus comprising:
   a water circulating system;
   an ozone generator;
   an eductor for entraining ozone generated by said ozone generator in water circulated by said circulating system;
   a reservoir for holding ozonated water; and
   a water withdrawal system for allowing withdrawal of ozonated water from the apparatus.

18. The apparatus of claim 17, further comprising a makeup water system to replace water withdrawn from said apparatus.

19. The apparatus of claim 17, further comprising a diffusion enhancing device at a discharge end of said eductor.

20. Apparatus for the production and selectively continuous or intermittent dispensation of ozonated fluids, the apparatus consisting essentially of:
   a water circulating system;
   an ozone generator;
   an eductor for entraining ozone generated by said ozone generator in water circulated by said circulating system;
   a holding vessel for storing ozonated water; and
   a water withdrawal system for allowing withdrawal of ozonated water from the apparatus.

21. The apparatus of claim 20, further comprising a makeup water system to replace water withdrawn from said apparatus.

22. The apparatus of claim 20, further comprising a diffusion enhancing device at a discharge end of said eductor.

23. The apparatus of claim 20, further comprising a vent apparatus for the removal of off gasses produced during ozonation of said water.

24. The apparatus of claim 20, further comprising apparatus for the destruction of off gasses produced during ozonation of said water.

25. Apparatus for the production and selectively continuous or intermittent dispensation of ozonated fluids for use in disinfecting food and other items, the apparatus consisting essentially of:
   an ozone generator;
   a water circulating system;
   a device for entraining ozone generated by said ozone generator in water circulated by said water circulating system,
   a reservoir for holding ozonated water;
   a water withdrawal system adapted to allow withdrawal of ozonated water from the apparatus; and
   means for recirculating water not withdrawn from said reservoir through said entraining means.

26. The apparatus of claim 25, wherein said water circulating system continuously circulates water through said entraining means until the water is withdrawn from the apparatus.

27. The apparatus of claim 25, further comprising a makeup water system to replace water withdrawn from the apparatus.

28. The apparatus of claim 25, further comprising a vent apparatus for the removal of off gasses produced during ozonation of said water.

29. The apparatus of claim 25, further comprising apparatus for the destruction of off gasses produced during ozonation of said water.

30. The apparatus of claim 25, wherein said ozone entraining means comprises an eductor.

31. The apparatus of claim 30, further comprising a diffusion enhancing device at a discharge of said eductor.

32. A method for continuously or intermittently providing ozonated water for disinfecting food and other items, the method comprising the steps of:
   generating ozone;
   entraining said ozone in water in a closed loop circulating and storage system;
   allowing selective removal of ozonated water from said circulating and storage system;
   applying removed ozonated water to an item to be disinfected; and
   recirculating ozonated water not removed from the circulating and storage system.

33. The method of claim 32, wherein said removed ozonated water has when it is removed from said apparatus an ozone concentration of at least about 0.5 parts per million.

34. The method of claim 33, wherein said ozone concentration is between about 0.1 milligrams and about 2.0 milligrams per liter.

35. The method of claim 32, wherein said removed ozonated water is left in contact with said item for contact with said item for less than about one minute.

36. The method of claim 32, comprising the step of removing off gasses produced during ozonization or during the ozone-generating process.

37. The method of claim 32, comprising the step of replacing water removed from the circulating and storage system.

38. The method of claim 32, including the step of circulating water continuously through said entraining means until the water is withdrawn from the apparatus.

* * * * *